US012591741B2

(12) United States Patent　　　　(10) Patent No.: US 12,591,741 B2
Tominaga et al.　　　　　　　　　　　(45) Date of Patent:　　Mar. 31, 2026

(54) VIOLATION PREDICTION APPARATUS, VIOLATION PREDICTION METHOD AND PROGRAM

(71) Applicant: NTT, Inc., Tokyo (JP)

(72) Inventors: Tomu Tominaga, Tokyo (JP); Takeshi Kurashima, Tokyo (JP); Shuichi Nishioka, Tokyo (JP); Shuhei Yamamoto, Tokyo (JP)

(73) Assignee: NTT, Inc., Tokyo (JP)

( * ) Notice: Subject to any disclaimer, the term of this patent is extended or adjusted under 35 U.S.C. 154(b) by 144 days.

(21) Appl. No.: 18/703,640

(22) PCT Filed: Nov. 29, 2021

(86) PCT No.: PCT/JP2021/043640
§ 371 (c)(1),
(2) Date: Apr. 22, 2024

(87) PCT Pub. No.: WO2023/095337
PCT Pub. Date: Jun. 1, 2023

(65) Prior Publication Data
US 2025/0238617 A1　　Jul. 24, 2025

(51) Int. Cl.
*G06F 40/284*　　(2020.01)
(52) U.S. Cl.
CPC ................................. *G06F 40/284* (2020.01)
(58) Field of Classification Search
CPC .............................. G06F 40/284; G06N 20/00
See application file for complete search history.

(56) References Cited

FOREIGN PATENT DOCUMENTS

CA　　2848046 A1 * 10/2014 ............. G06Q 10/10
JP　　2020149024 A * 9/2020

OTHER PUBLICATIONS

Wang, Zhiwei, et al. "Understanding and predicting weight loss with mobile social networking data." Proceedings of the 2017 ACM on Conference on Information and Knowledge Management. 2017. (Year: 2017).*

(Continued)

*Primary Examiner* — Anne L Thomas-Homescu
(74) *Attorney, Agent, or Firm* — IPUSA, PLLC

(57)　　　　　　　ABSTRACT

An object of the present disclosure is to predict an occurrence probability of a violation with high accuracy.
Therefore, content of the present disclosure is a violation prediction apparatus that predicts an occurrence probability of a violation, and is configured to: evaluate conversation data that includes conversation partner information for identifying a partner of a conversation and indicates a conversation content and a conversation situation, thereby obtaining a conversation content evaluation value and a conversation situation evaluation value; evaluate a relationship with the partner of the conversation based on relationship data that indicates a human relationship with a target user and on the conversation partner information, thereby obtaining a relationship evaluation value; calculate a social interaction effect based on the conversation content evaluation value, the conversation situation evaluation value, and the relationship evaluation value; calculate a time attenuation value of the social interaction effect based on a time attenuation function; and calculate an occurrence probability of a violation.

4 Claims, 14 Drawing Sheets

(56)    References Cited

OTHER PUBLICATIONS

Zhiwei Wang et al., "Understanding and predicting weight loss with mobile social networking data", Proceedings of the 2017 ACM on Conference on Information and Knowledge Management. 2017. DOI: https://doi.org/10.1145/3132847.3133019, CIKM'17, Nov. 6-10, 2017, Singapore, Session 7C: Social Networks 1, pp. 1269-1278.
Eleni Karfopoulou et al., "The role of social support in weight loss maintenance: results from the MedWeight study", Journal of behavioral medicine 39.3 (2016): 511-518, Jan. 22, 2016, pp. 1-9.

* cited by examiner

START

S100

VIOLATION REFERENCE CONSTANT INPUT UNIT 104 RECEIVES INPUT OF VIOLATION REFERENCE CONSTANT BY OPERATION SUBJECT OF PRESENT DEVICE, AND OUTPUTS INPUT VIOLATION REFERENCE CONSTANT TO VIOLATION LEVEL CALCULATION UNIT 105.

P1

S101

CONVERSATION DATA EVALUATION UNIT 106 RECEIVES CONVERSATION DATA FROM CONVERSATION DATA STORAGE UNIT 102, EVALUATES CONVERSATION DATA, OUTPUTS INFORMATION REGARDING PARTNER OF CONVERSATION TO RELATIONSHIP DATA EVALUATION UNIT 107, AND OUTPUTS EVALUATION VALUES REGARDING CONTENT AND SITUATION OF CONVERSATION TO SOCIAL INTERACTION EFFECT CALCULATION UNIT 108.

S102

RELATIONSHIP DATA EVALUATION UNIT 107 RECEIVES RELATIONSHIP DATA FROM RELATIONSHIP DATA STORAGE UNIT 103 AND CONVERSATION PARTNER INFORMATION FROM CONVERSATION DATA EVALUATION UNIT 106, EVALUATES RELATIONSHIP WITH PARTNER OF CONVERSATION, AND OUTPUTS EVALUATION RESULT TO SOCIAL INTERACTION EFFECT CALCULATION UNIT 108.

S103

SOCIAL INTERACTION EFFECT CALCULATION UNIT 108 RECEIVES CONVERSATION CONTENT EVALUATION VALUE AND CONVERSATION SITUATION EVALUATION VALUE FROM CONVERSATION DATA EVALUATION UNIT 106 AND RELATIONSHIP EVALUATION VALUE FROM RELATIONSHIP DATA EVALUATION UNIT 107, CALCULATES SOCIAL INTERACTION EFFECT, AND OUTPUTS SOCIAL INTERACTION EFFECT TO SOCIAL INTERACTION EFFECT TIME ATTENUATION PROCESSING UNIT 110.

S104

TIME ATTENUATION FUNCTION INPUT UNIT 109 RECEIVES INPUT OF TIME ATTENUATION FUNCTION BY OPERATION SUBJECT OF PRESENT DEVICE, AND OUTPUTS INPUT TIME ATTENUATION FUNCTION TO SOCIAL INTERACTION EFFECT TIME ATTENUATION PROCESSING UNIT 110 AND TIME ATTENUATION FUNCTION STORAGE UNIT 111.

P2

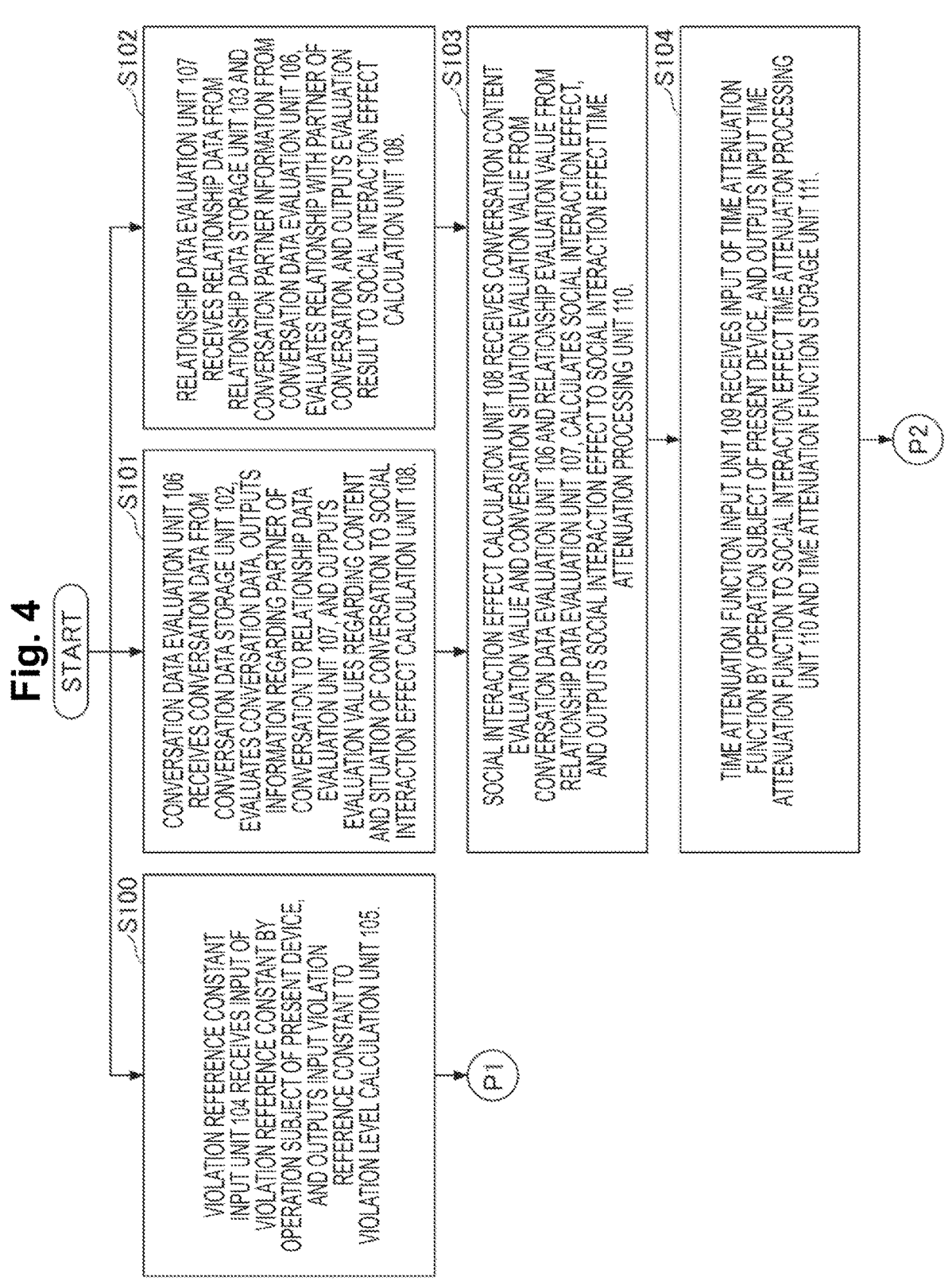

Fig. 5

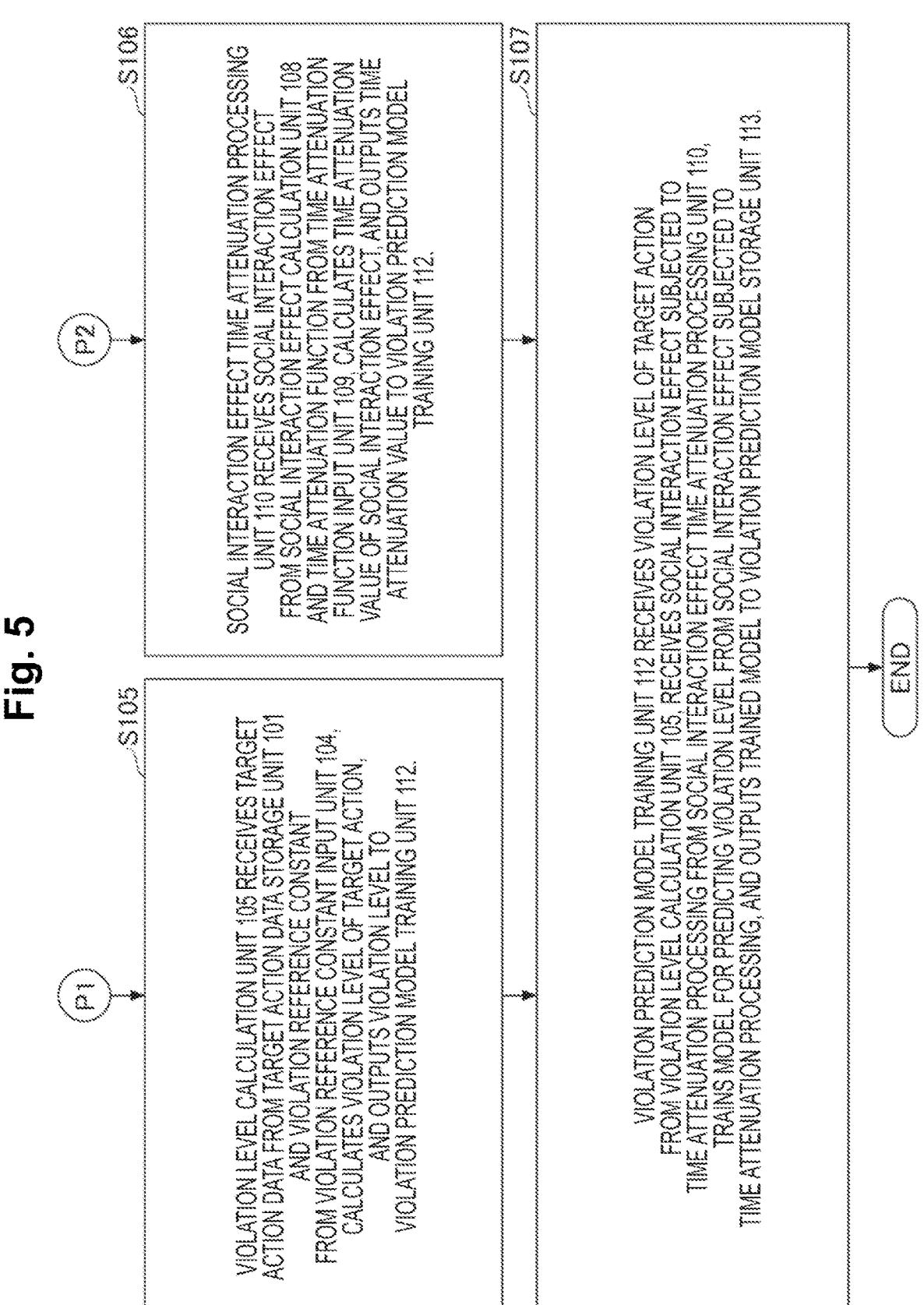

P1

S105

VIOLATION LEVEL CALCULATION UNIT 105 RECEIVES TARGET ACTION DATA FROM TARGET ACTION DATA STORAGE UNIT 101 AND VIOLATION REFERENCE CONSTANT FROM VIOLATION REFERENCE CONSTANT INPUT UNIT 104, CALCULATES VIOLATION LEVEL OF TARGET ACTION, AND OUTPUTS VIOLATION LEVEL TO VIOLATION PREDICTION MODEL TRAINING UNIT 112.

P2

S106

SOCIAL INTERACTION EFFECT TIME ATTENUATION PROCESSING UNIT 110 RECEIVES SOCIAL INTERACTION EFFECT FROM SOCIAL INTERACTION EFFECT CALCULATION UNIT 108 AND TIME ATTENUATION FUNCTION FROM TIME ATTENUATION FUNCTION INPUT UNIT 109, CALCULATES TIME ATTENUATION VALUE OF SOCIAL INTERACTION EFFECT, AND OUTPUTS TIME ATTENUATION VALUE TO VIOLATION PREDICTION MODEL TRAINING UNIT 112.

S107

VIOLATION PREDICTION MODEL TRAINING UNIT 112 RECEIVES VIOLATION LEVEL OF TARGET ACTION FROM VIOLATION LEVEL CALCULATION UNIT 105, RECEIVES SOCIAL INTERACTION EFFECT SUBJECTED TO TIME ATTENUATION PROCESSING FROM SOCIAL INTERACTION EFFECT TIME ATTENUATION PROCESSING UNIT 110, TRAINS MODEL FOR PREDICTING VIOLATION LEVEL FROM SOCIAL INTERACTION EFFECT SUBJECTED TO TIME ATTENUATION PROCESSING, AND OUTPUTS TRAINED MODEL TO VIOLATION PREDICTION MODEL STORAGE UNIT 113.

END

Fig. 6

START

S200 — CONVERSATION DATA EVALUATION UNIT 201 RECEIVES CONVERSATION DATA AS INPUT, EVALUATES CONVERSATION DATA, OUTPUTS EVALUATION VALUES OF CONVERSATION CONTENT AND CONVERSATION SITUATION TO SOCIAL INTERACTION EFFECT CALCULATION UNIT 203, AND OUTPUTS CONVERSATION PARTNER INFORMATION TO RELATIONSHIP DATA EVALUATION UNIT 202

S201 — RELATIONSHIP DATA EVALUATION UNIT 202 RECEIVES RELATIONSHIP DATA AS INPUT, RECEIVES CONVERSATION PARTNER INFORMATION FROM CONVERSATION DATA EVALUATION UNIT 201, EVALUATES RELATIONSHIP WITH PARTNER OF CONVERSATION, AND OUTPUTS EVALUATION RESULT TO SOCIAL INTERACTION EFFECT CALCULATION UNIT 203

S202 — SOCIAL INTERACTION EFFECT CALCULATION UNIT 203 RECEIVES CONVERSATION CONTENT EVALUATION VALUE AND CONVERSATION SITUATION EVALUATION VALUE FROM CONVERSATION DATA EVALUATION UNIT 201 AND RELATIONSHIP EVALUATION VALUE FROM RELATIONSHIP DATA EVALUATION UNIT 202, CALCULATES SOCIAL INTERACTION EFFECT ON BASIS OF THESE, AND OUTPUTS SOCIAL INTERACTION EFFECT TO SOCIAL INTERACTION EFFECT TIME ATTENUATION PROCESSING UNIT 205

S203 — SOCIAL INTERACTION EFFECT TIME ATTENUATION PROCESSING UNIT 205 RECEIVES SOCIAL INTERACTION EFFECT FROM SOCIAL INTERACTION EFFECT CALCULATION UNIT 203 AND TIME ATTENUATION FUNCTION FROM TIME ATTENUATION FUNCTION STORAGE UNIT 204, CALCULATES TIME ATTENUATION VALUE OF SOCIAL INTERACTION EFFECT, AND OUTPUTS TIME ATTENUATION FUNCTION TO VIOLATION PREDICTION UNIT 207

S204 — VIOLATION PREDICTION UNIT 207 RECEIVES SOCIAL INTERACTION EFFECT SUBJECTED TO TIME ATTENUATION PROCESSING FROM SOCIAL INTERACTION EFFECT TIME ATTENUATION PROCESSING UNIT 205 AND VIOLATION PREDICTION MODEL FROM VIOLATION PREDICTION MODEL STORAGE UNIT 206, AND CALCULATES AND OUTPUTS OCCURRENCE PROBABILITY OF VIOLATION

END

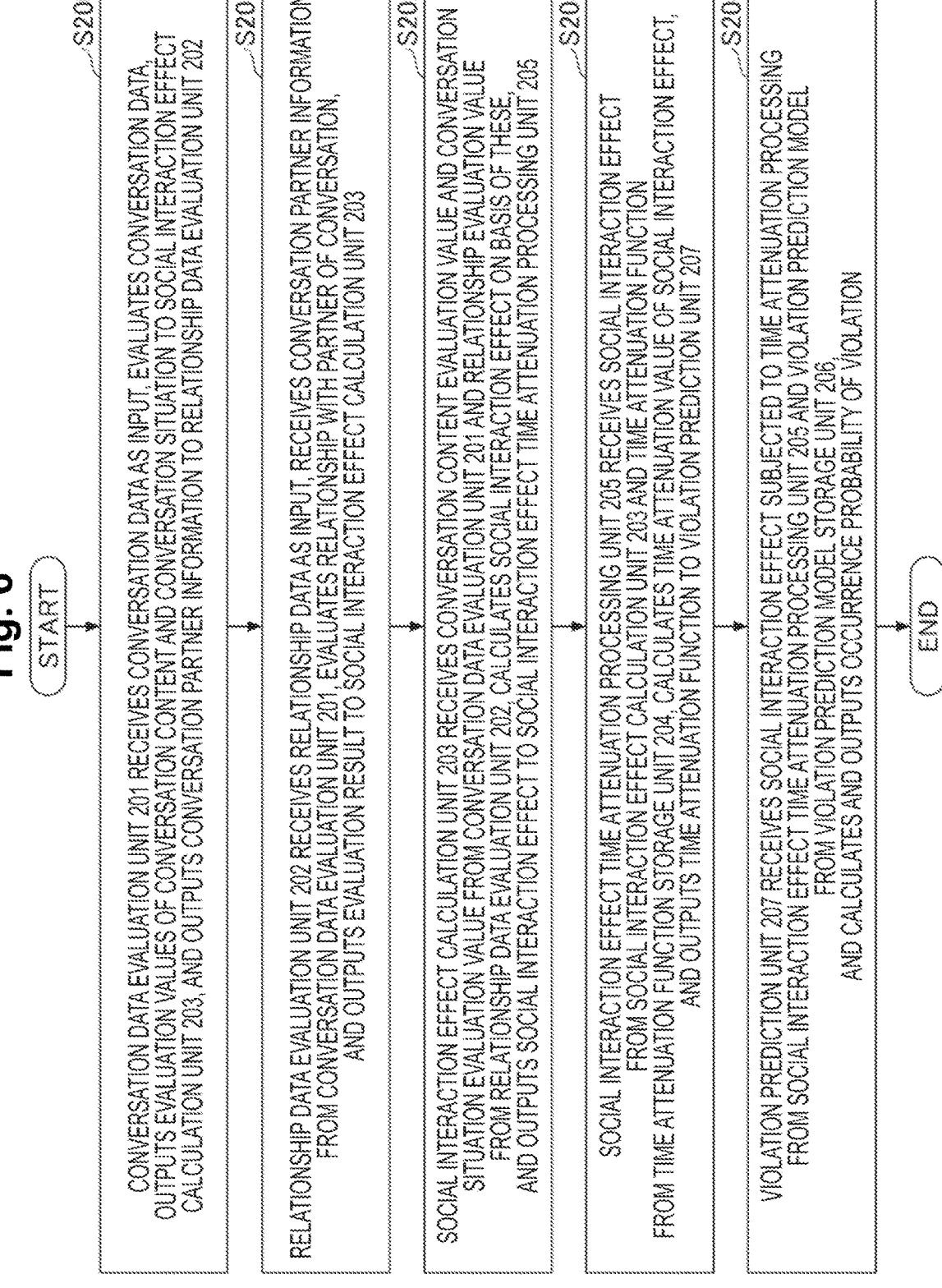

Fig. 7

| USER ID | CONVERSATION ID | CONTENT | SITUATION | PARTNER | START TIME | END TIME |
|---|---|---|---|---|---|---|
| u1 | 1 | "AT WORK TODAY ..." | Offline | v101 | 2021-08-31 17:56:21 | 2021-08-31 18:23:01 |
| u1 | 2 | "THIS TV ..." | Offline | v039 | 2021-09-01 19:00:11 | 2021-09-01 19:05:59 |
| ... | ... | ... | ... | ... | ... | ... |
| u1 | 3981 | "GOOD NIGHT" | Offline | v039 | 2021-12-09 00:01:58 | 2021-12-09 00:02:01 |
| u2 | 1 | "THIS COMING HOLIDAY ..." | Online | v904 | 2021-08-27 18:45:07 | 2021-08-27 21:31:47 |
| ... | ... | ... | ... | ... | ... | ... |
| u2 | 10023 | "THIS COFFEE ..." | Offline | v063 | 2021-12-31 23:31:09 | 2021-12-31 23:39:11 |
| ... | ... | ... | ... | ... | ... | ... |
| uN | 72 | "TOMORROW'S MEETING ..." | Online | v721 | 2021-11-18 20:04:41 | 2021-11-18 20:38:07 |

Fig. 8

| USER ID | CONVERSATION ID | TIME | NUMBER OF CHARACTERS | TOPIC | ... | IMPRESSION | DISTANCE (km) | MEANS | ... | PLACE |
|---------|-----------------|------|----------------------|-------|-----|------------|---------------|-------|-----|-------|
| u1 | 1 | 00:26:40 | 1809 | Work | ... | 4 | 0.001 | FTF | ... | Car |
| u1 | 2 | 00:05:48 | 739 | TV | ... | 2 | 0.002 | FTF | ... | Home |
| ... | ... | ... | ... | ... | ... | ... | ... | ... | ... | ... |
| u1 | 3981 | 00:00:03 | 4 | Greeting | ... | 5 | 0.001 | FTF | ... | Home |
| u2 | 1 | 02:46:40 | 8971 | Play | ... | 7 | 38.326 | Phone | ... | Home |
| ... | ... | ... | ... | ... | ... | ... | ... | ... | ... | ... |
| u2 | 10023 | 00:08:02 | 327 | Food | ... | 1 | 0.003 | FTF | ... | Home |
| ... | ... | ... | ... | ... | ... | ... | ... | ... | ... | ... |
| uN | 72 | 00:33:26 | 3019 | Work | ... | 2 | 17091.062 | Phone | ... | Workplace |

EVALUATION VALUE OF CONVERSATION CONTENT

EVALUATION VALUE OF CONVERSATION SITUATION

Fig. 9

| USER ID | CONVERSATION ID | PARTNER |
|---------|-----------------|---------|
| u1 | 1 | v101 |
| u1 | 2 | v039 |
| ... | ... | ... |
| u1 | 3981 | v039 |
| u2 | 1 | v904 |
| ... | ... | ... |
| u2 | 10023 | v063 |
| ... | ... | ... |
| uN | 72 | v721 |

Fig. 10

| USER ID | CONVERSATION ID | AFFINITY | RELIABILITY | PERIOD (NUMBER OF DAYS) | ... | CONTACT FREQUENCY |
|---|---|---|---|---|---|---|
| u1 | 1 | 2 | 4 | 181 | ... | 6 |
| u1 | 2 | 7 | 7 | 7819 | ... | 7 |
| ... | ... | ... | ... | ... | ... | ... |
| u1 | 3981 | 7 | 7 | 7819 | ... | 7 |
| u2 | 1 | 6 | 3 | 22 | ... | 1 |
| ... | ... | ... | ... | ... | ... | ... |
| u2 | 10023 | 3 | 6 | 11093 | ... | 2 |
| ... | ... | ... | ... | ... | ... | ... |
| uN | 72 | 1 | 5 | 539 | ... | 4 |

Fig. 11

| USER ID | CONVERSATION ID | SOCIAL INTERACTION EFFECT |
|---|---|---|
| u1 | 1 | 8 |
| u1 | 2 | 14 |
| ... | ... | ... |
| u1 | 3981 | 35 |
| u2 | 1 | 21 |
| ... | ... | ... |
| u2 | 10023 | 6 |
| ... | ... | ... |
| uN | 72 | 10 |

Fig. 12

| USER ID | ACTION ID | TARGET VALUE (kcal) | MEASUREMENT VALUE (kcal) | RECORDING TIME |
|---|---|---|---|---|
| u1 | 1 | 2000 | 2023 | 2021-08-31 22:01:51 |
| u1 | 2 | 1900 | 2800 | 2021-09-01 20:59:37 |
| ⋮ | ⋮ | ⋮ | ⋮ | ⋮ |
| u1 | 96 | 2200 | 3153 | 2021-12-09 21:44:08 |
| u2 | 1 | 3000 | 2987 | 2021-08-28 00:10:53 |
| ⋮ | ⋮ | ⋮ | ⋮ | ⋮ |
| u2 | 117 | 3000 | 4500 | 2022-01-01 01:00:59 |
| ⋮ | ⋮ | ⋮ | ⋮ | ⋮ |
| uN | 62 | 2100 | 2166 | 2021-11-18 23:09:55 |

| USER ID | ACTION ID | VIOLATION LEVEL |
|---|---|---|
| u1 | 1 | 0 |
| u1 | 2 | 1 |
| ⋮ | ⋮ | ⋮ |
| u1 | 96 | 0 |
| u2 | 1 | 0 |
| ⋮ | ⋮ | ⋮ |
| u2 | 117 | 1 |
| ⋮ | ⋮ | ⋮ |
| uN | 62 | 0 |

(b)

| USER ID | ACTION ID | VIOLATION LEVEL |
|---|---|---|
| u1 | 1 | 23 |
| u1 | 2 | 900 |
| ⋮ | ⋮ | ⋮ |
| u1 | 96 | 953 |
| u2 | 1 | −13 |
| ⋮ | ⋮ | ⋮ |
| u2 | 117 | 1500 |
| ⋮ | ⋮ | ⋮ |
| uN | 62 | 66 |

* BINARIZATION BY DETERMINATION REFERENCE CONSTANT ($a = 100$) (ABOVE EXAMPLE IS CASE OF TREATING $a$ AS REAL NUMBER VALUE)

Fig. 14

| USER ID | CONVERSATION ID | SOCIAL INTERACTION EFFECT SUBJECTED TO TIME ATTENUATION PROCESSING |
|---|---|---|
| u1 | 1 | 0.266828899861 |
| u1 | 2 | 0.482223273932 |
| ... | ... | ... |
| u1 | 3981 | 17.20836603365 |
| u2 | 1 | 0.290522222269 |
| ... | ... | ... |
| u2 | 10023 | 2.95000462912 |
| ... | ... | ... |
| uN | 72 | 4.916674381 86 |

VIOLATION PREDICTION APPARATUS, VIOLATION PREDICTION METHOD AND PROGRAM

TECHNICAL FIELD

The content of the present disclosure relates to a violation prediction apparatus, a violation prediction method, and a program.

BACKGROUND ART

In recent years, there is a demand for highly accurate prediction of a user's action (violation) against achievement of a purpose set by the user himself/herself in consideration of social interaction of the user.

Examples include an action of taking 3500 kcal or more despite an attempt to reduce daily calorie intake to 2000 kcal or less, or an action of increasing an amount of 5 kg or more despite an attempt to suppress weight gain to less than 1 kg for one month. It is known that such violation is deeply associated with social interaction. For example, Non Patent Literature 1 describes that the frequency of actions such as following and replying between users in a weight management application and information of a partner thereof (examples: whether of opposite sex or not, whether thin or not, or the like) are important for prediction of the achievement rate of the target weight. In addition, Non Patent Literature 2 shows a result that a person who succeeds in weight maintenance after weight loss has many experiences of not being merely encouraged or urged but being complimented or working on weight loss together in interaction with family and friends.

CITATION LIST

Non Patent Literature

Non Patent Literature 1: Wang, Zhiwei, et al. "Understanding and predicting weight loss with mobile social networking data." Proceedings of the 2017 ACM on Conference on Information and Knowledge Management. 2017. DOI: https://doi.org/10.1145/3132847.3133019
Non Patent Literature 2: Karfopoulou, Eleni, et al. "The role of social support in weight loss maintenance: results from the MedWeight study." Journal of behavioral medicine 39.3 (2016): 511-518.

SUMMARY OF INVENTION

Technical Problem

However, these related arts are certainly techniques and knowledge that contribute to prediction of violation, but still have the following problems.

First, the prediction performance of the violation is insufficient (Non Patent Literature 1). Non Patent Literature 1 reports a result that information regarding a follow relationship and a reply frequency of a user certainly improves prediction performance of a violation, but has lower prediction ability than basic attribute information such as age, gender, and body mass index (BMI) of the user.

Next, assessment of social interaction is limited. That is, the relationship with the partner(s) and the qualitative evaluation of conversation are not exhaustive. Specifically, basic information of the partner is considered in the evaluation of the relationship (Non Patent Literatures 1 and 2), but a psychological or physical sense of distance to the partner in social interaction such as affinity to the partner, a sense of trust, strength of connection, a period of time of knowing the partner, and a distance in communication is not evaluated. In addition, in the evaluation of conversation, the content is not considered in the first place (Non Patent Literature 1), or only the presence or absence of interaction directly related to weight loss is considered (Non Patent Literature 2). That is, the means of conversation, the time required for conversation, the topic of conversation, and the impression on conversation are not evaluated.

Finally, the fact that the influence of social interaction attenuates (changes) with time is not considered (Non Patent Literatures 1 and 2). If the same social interaction occurs once in the past close to the target violation and once in the past far from the target violation, the influence on the violation due to these social interactions is regarded as the same in the related arts. In practice, it is assumed that the influence of the farther past is attenuated with time, and thus the influence of the closer past is relatively large, but the related arts do not grasp this point.

That is, the problems to be solved by the present invention are that (1) evaluation of a partner of social interaction and a nature of conversation is not exhaustive, (2) temporal attenuation of the influence of the social interaction is not considered, and (3) prediction performance of a violation is low.

An object of the present invention is to predict an occurrence probability of a violation with high accuracy by evaluating a partner or a nature of conversation in social interaction of a user and considering a temporal attenuating property of the influence of the social interaction, in order to solve the above-described problems of the related arts.

Solution to Problem

In order to achieve the above object, an invention according to claim 1 is a violation prediction apparatus that predicts an occurrence probability of a violation, the violation prediction apparatus including: a conversation data evaluation unit configured to evaluate conversation data that includes conversation partner information for identifying a partner of a conversation and indicates a conversation content and a conversation situation, thereby obtaining a conversation content evaluation value and a conversation situation evaluation value; a relationship data evaluation unit configured to evaluate a relationship with the partner of the conversation based on relationship data that indicates a human relationship with a target user and on the conversation partner information, thereby obtaining a relationship evaluation value; a social interaction effect calculation unit configured to calculate a social interaction effect based on the conversation content evaluation value, the conversation situation evaluation value, and the relationship evaluation value; a social interaction effect time attenuation processing unit configured to calculates a time attenuation value of the social interaction effect based on a time attenuation function; and a violation prediction unit configured to calculate an occurrence probability of a violation based on the social interaction effect subjected to time attenuation processing.

Advantageous Effects of Invention

As described above, according to the present invention, an effect can be obtained that an occurrence probability of a violation can be predicted with high accuracy by evaluating a partner or a nature of conversation in social interaction of a user and considering a temporal attenuating property of the influence of the social interaction.

BRIEF DESCRIPTION OF DRAWINGS

FIG. 2 is a mechanism configuration diagram of the violation prediction apparatus according to the embodiment of the present invention.

FIG. 4 is a flowchart illustrating processing of the violation prediction apparatus (training mechanism).

FIG. 5 is a flowchart illustrating processing of the violation prediction apparatus (training mechanism).

FIG. 6 is a flowchart illustrating processing of the violation prediction apparatus (prediction mechanism).

FIG. 7 is a diagram illustrating an example of a storage format of a conversation data storage unit 102.

FIG. 8 is a diagram illustrating an example of an output format of conversation data evaluation values.

FIG. 9 is a diagram illustrating an example of an output format of conversation partner information.

FIG. 10 is a diagram illustrating an example of an output format of an evaluation value of a relationship.

FIG. 11 is a diagram illustrating an example of an output format of a social interaction effect.

FIG. 12 is a diagram illustrating an example of a storage format of a target action data storage unit in a case where daily calorie intake is a target action.

FIG. 13 is a diagram illustrating an example of an output format of a violation level, in which (a) illustrates a case where the violation level is expressed by a discrete value, and (b) illustrates a case where the violation level is expressed by a continuous value.

FIG. 14 is a diagram illustrating an example of an output format of a social interaction effect subjected to time attenuation processing.

DESCRIPTION OF EMBODIMENTS

Hereinafter, embodiments of the present invention will be described with reference to the drawings.

[Functional Configuration]

Figure 1:
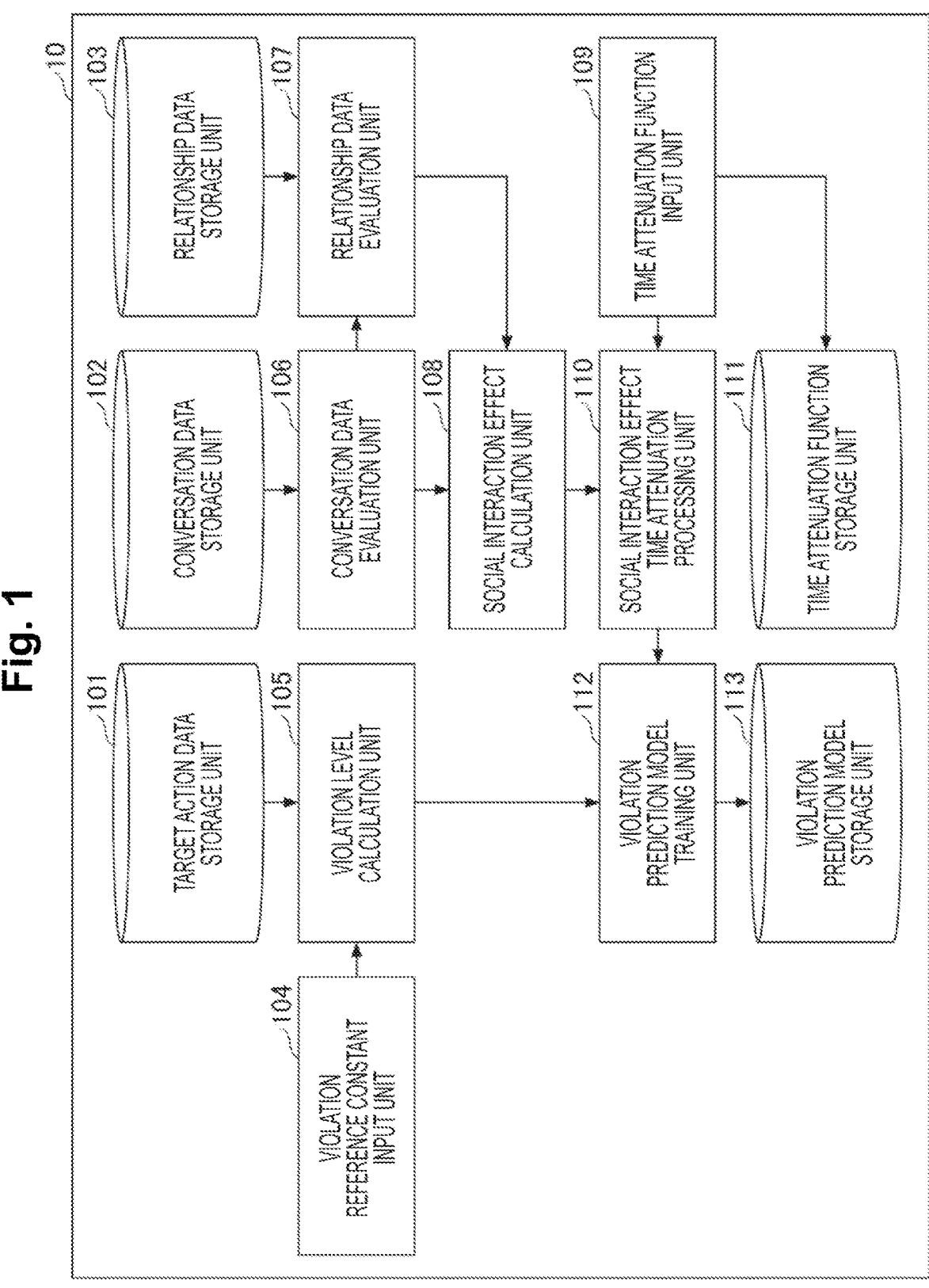
FIG. 1 is a mechanism configuration diagram of a violation prediction apparatus according to an embodiment of the present invention.
Figure 2:
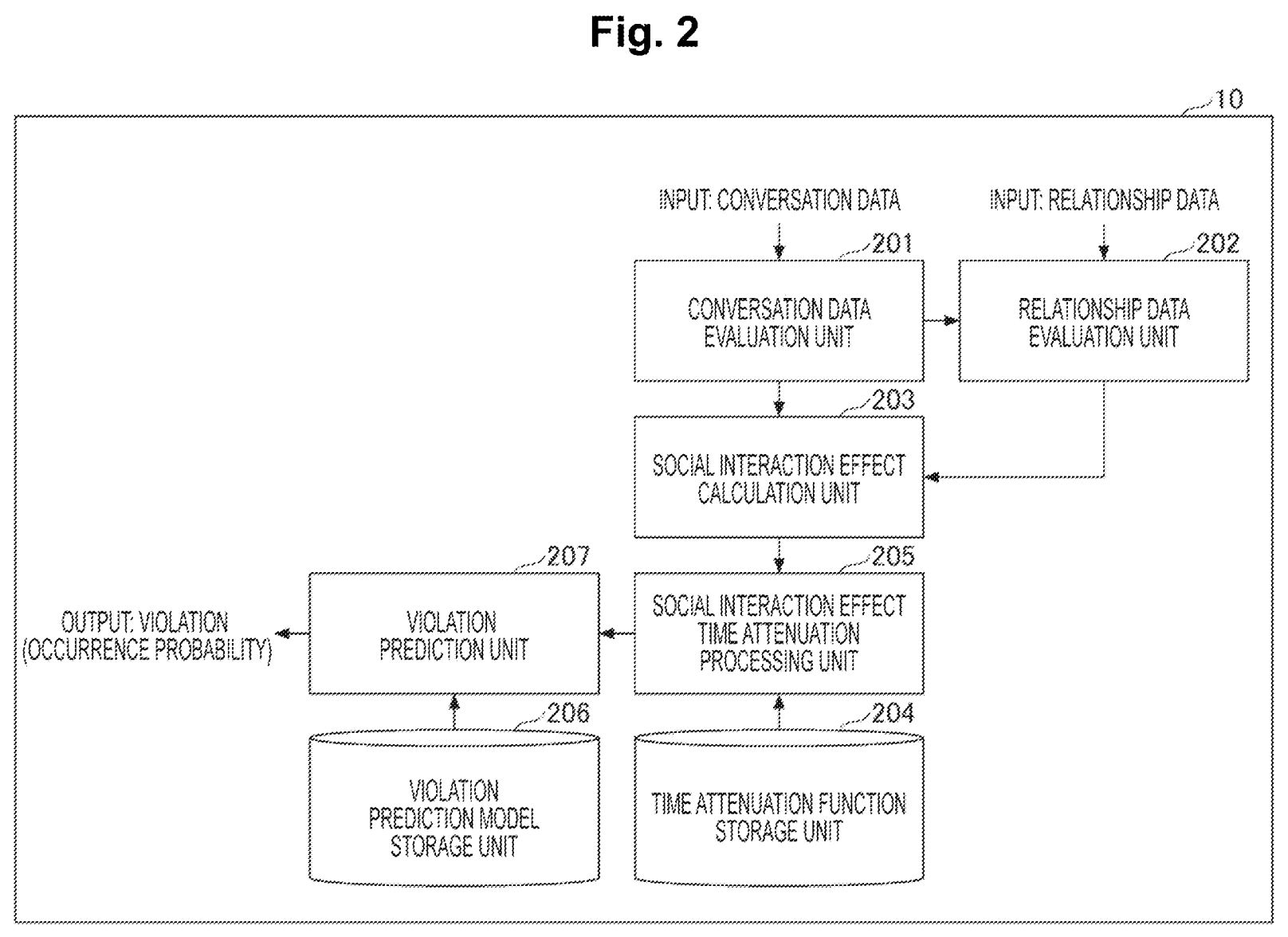

FIGS. 1 and 2 are mechanism configuration diagrams of a violation prediction apparatus according to an embodiment of the present invention. The functional configuration includes a training mechanism (FIG. 1) and a prediction mechanism (FIG. 2).

The training mechanism (FIG. 1) of the violation prediction apparatus 10 includes a target action data storage unit 101, a conversation data storage unit 102, a relationship data storage unit 103, a violation reference constant input unit 104, a violation level calculation unit 105, a conversation data evaluation unit 106, a relationship data evaluation unit 107, a social interaction effect calculation unit 108, a time attenuation function input unit 109, a social interaction effect time attenuation processing unit 110, a time attenuation function storage unit 111, a violation prediction model training unit 112, and a violation prediction model storage unit 113 illustrated in FIG. 1. The training mechanism outputs a model that has been trained with respect to a relationship between a magnitude of an effect of social interaction in consideration of temporal attenuation and a violation level of a target action and a parameter of the model.

Among these, a target value for a target action, an actual measurement value of the target action, and the time when the target action is recorded are stored in the target action data storage unit 101 in association with a user identification (ID) and an action ID.

In the conversation data storage unit 102, information regarding the content of conversation, information regarding the partner of the conversation, and the time when the conversation is recorded are stored in association with the user ID and the conversation ID.

In the relationship data storage unit 103, identification information of people connected to (having a human relationship with) a target user is stored in association with the user ID.

The prediction mechanism (FIG. 2) of the violation prediction apparatus 10 includes a conversation data evaluation unit 201, a relationship data evaluation unit 202, a social interaction effect calculation unit 203, a time attenuation function storage unit 204, a social interaction effect time attenuation processing unit 205, a violation prediction model storage unit 206, and a violation prediction unit 207. The prediction mechanism predicts (an occurrence probability of) the violation based on input conversation data and relationship data.

[Hardware Configuration]

Figure 3:
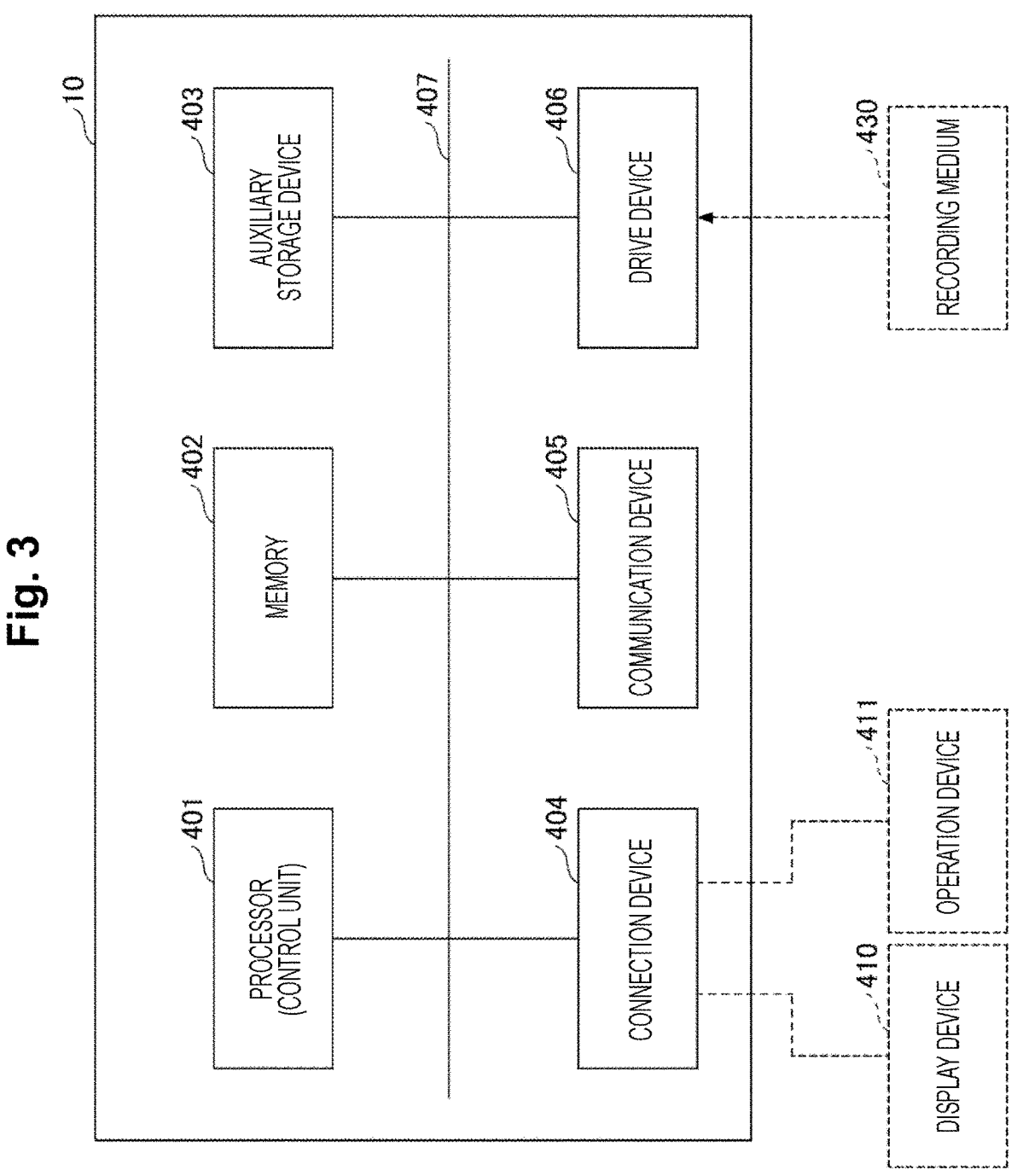
FIG. 3 is a hardware configuration diagram of the violation prediction apparatus.

Next, a hardware configuration of the violation prediction apparatus 10 will be described with reference to FIG. 3. FIG. 3 is a hardware configuration diagram of the violation prediction apparatus.

As illustrated in FIG. 3, the violation prediction apparatus 10 includes a processor 401, a memory 402, an auxiliary storage device 403, a connection device 404, a communication device 405, and a drive device 406. Note that hardware components constituting the violation prediction apparatus 10 are mutually connected via a bus 407.

The processor 401 serves as a control unit that controls the entire violation prediction apparatus 10, and includes various arithmetic devices such as a central processing unit (CPU). The processor 401 reads and executes various programs on the memory 402. Note that the processor 401 may include general-purpose computing on graphics processing units (GPGPU).

The memory 402 includes a main storage device such as a read only memory (ROM) and a random access memory (RAM). The processor 401 and the memory 402 form a so-called computer, and the processor 401 executes various programs read on the memory 402, so that the computer implements various functions.

The auxiliary storage device 403 stores various programs and various types of information used when the various programs are executed by the processor 401.

The connection device 404 is a connection device that connects an external device (for example, the display device 410 and the operation device 411) and the violation prediction apparatus 10.

The communication device 405 is a communication device for transmitting and receiving various types of information to and from other devices.

The drive device 406 is a device for setting a recording medium 430. The recording medium 430 here includes a medium that optically, electrically, or magnetically records information, such as a compact disc read-only memory (CD-ROM), a flexible disk, or a magneto-optical disk. Furthermore, the recording medium 430 may include a semiconductor memory or the like that electrically records information, such as a read only memory (ROM) or a flash memory.

Note that the various programs installed in the auxiliary storage device 403 are installed, for example, by setting the distributed recording medium 430 in the drive device 406 and reading the various programs recorded in the recording medium 430 by the drive device 406.

Alternatively, various programs installed in the auxiliary storage device 403 may be installed by being downloaded from a network via the communication device 405.

[Processing or Operation of Present Embodiment]

Next, processing or operation of the present embodiment will be described with reference to FIGS. 4 to 14.

FIGS. 4 to 6 are flowcharts illustrating processing of the violation prediction apparatus. The processing of the violation prediction apparatus is different between the training mechanism (FIGS. 4 and 5) and the prediction mechanism (FIG. 6).

<Processing Procedure in Training Mechanism>

S100: the violation reference constant input unit 104 receives input of a violation reference constant by an operation subject of the violation prediction apparatus 10, and outputs the input violation reference constant to the violation level calculation unit 105. The definition of the violation reference constant and the specific processing procedure of S100 will be described later.

S101: the conversation data evaluation unit 106 receives the conversation data from the conversation data storage unit 102, evaluates the conversation data, outputs information regarding the partner of the conversation to the relationship data evaluation unit 107, and outputs evaluation values regarding the content and situation of the conversation to the social interaction effect calculation unit 108. The conversation data is data in which the content and situation of the conversation and information of the partner are recorded in time series. The data format related to the content of the conversation does not matter (text, audio, image, or the like). The data related to the partner of the conversation is identification information of the partner of the conversation, and any form (name, the number of My Number operated in Japan, or the like) may be used as long as the data is information that can uniquely identify the partner of the conversation. The conversation data evaluation unit 106 evaluates a conversation content, a conversation partner, and a conversation situation from the conversation data. Evaluation items of the conversation content include, for example, the time required for the conversation, the number of characters, the topic, the impression, and the like but are not limited thereto, and may be determined in any manner by the operation subject of the violation prediction apparatus 10. Evaluation items of the conversation partner include, for example, affinity, reliability, a period of time of association, a contact frequency, and the like but are not limited thereto, and may be determined in any manner by the operation subject of the violation prediction apparatus 10. Evaluation items of the conversation situation include, for example, a physical distance to the conversation partner, a means of conversation, a place of conversation, and the like, but are not limited thereto, and may be determined in any manner by the operation subject of the violation prediction apparatus 10. FIG. 7 illustrates an example of a storage format of the conversation data storage unit 102. FIG. 8 illustrates an example of an output format of a conversation data evaluation value from the conversation data evaluation unit 106 to the social interaction effect calculation unit 108 in S101. FIG. 9 illustrates an example of an output format of conversation partner information from the conversation data evaluation unit 106 to the relationship data evaluation unit 107 in S101. A specific processing procedure will be described later.

S102: the relationship data evaluation unit 107 receives the relationship data from the relationship data storage unit 103 and the conversation partner information from the conversation data evaluation unit 106, evaluates the relationship with the partner of the conversation, and outputs an evaluation result to the social interaction effect calculation unit 108. The relationship data is identification information of a person with whom the target user is connected, and the form of the relationship data is not limited as long as the relationship data is information that can uniquely identify the person. Evaluation items of the relationship include, for example, affinity, reliability, a period of time of association, a contact frequency, and the like but are not limited thereto, and may be determined in any manner by the operation subject of the violation prediction apparatus 10. FIG. 10 illustrates an example of an output format of the evaluation value of the relationship in S102. A specific processing procedure will be described later.

S103: the social interaction effect calculation unit 108 receives a conversation content evaluation value and a conversation situation evaluation value from the conversation data evaluation unit 106 and a relationship evaluation value from the relationship data evaluation unit 107, calculates a social interaction effect, and outputs the social interaction effect to the social interaction effect time attenuation processing unit 110. The social interaction effect corresponding to a certain target action of a certain user is calculated from the conversation content evaluation value, the conversation situation evaluation value, and the relationship evaluation value, or a part thereof, in a conversation that has occurred before the target action.

FIG. 11 illustrates an example of an output format of the social interaction effect according to S103 (example in which magnitude of the social interaction effect is determined by the product of an evaluation value of impression of conversation content and an evaluation value of affinity of conversation partner). A specific processing procedure will be described later.

S104: the time attenuation function input unit 109 receives an input of a time attenuation function by the operation subject of the violation prediction apparatus 10, and outputs the input time attenuation function to the social interaction effect time attenuation processing unit 110 and the time attenuation function storage unit 111. The time attenuation function may be determined in any manner by the operation subject of the violation prediction apparatus 10. Specific processing will be described later.

S105: the violation level calculation unit 105 receives target action data from the target action data storage unit 101 and the violation reference constant from the violation reference constant input unit 104, calculates a violation level of the target action, and outputs the violation level to the violation prediction model training unit 112. The violation level may be calculated as a discrete value or may be calculated as a continuous value. FIG. 12 illustrates an example of a storage format of the target action data storage unit 101. FIG. 13 illustrates an example of an output format of the violation level in S105. A specific processing procedure will be described later.

S106: the social interaction effect time attenuation processing unit 110 receives the social interaction effect from the social interaction effect calculation unit 108 and the time attenuation function from the time attenuation function input unit 109, calculates a time attenuation value of the social interaction effect, and outputs the time attenuation value to the violation prediction model training unit 112. FIG. 14 illustrates an example of an output format of a social interaction effect subjected to time attenuation processing. A specific processing procedure will be described later.

S107: the violation prediction model training unit 112 receives the violation level of the target action from the violation level calculation unit 105, receives the social interaction effect subjected to time attenuation processing from the social interaction effect time attenuation processing unit 110, trains a model for predicting the violation level from the social interaction effect subjected to time attenuation processing, and outputs the trained model to the violation prediction model storage unit 113. The model used here may be any model as long as it is based on supervised training. A specific processing procedure will be described later.

<Processing Procedure in Prediction Mechanism>

S200: the conversation data evaluation unit 201 receives the conversation data as an input, evaluates the conversation data, outputs evaluation values of the conversation content and the conversation situation to the social interaction effect calculation unit 203, and outputs the conversation partner information to the relationship data evaluation unit 202.

S201: the relationship data evaluation unit 202 receives the relationship data as an input, receives the conversation partner information from the conversation data evaluation unit 201, evaluates the relationship with the partner of the conversation, and outputs an evaluation result to the social interaction effect calculation unit 203.

S202: the social interaction effect calculation unit 203 receives the conversation content evaluation value and the conversation situation evaluation value from the conversation data evaluation unit 201 and the relationship evaluation value from the relationship data evaluation unit 202, calculates a social interaction effect based on these, and outputs the social interaction effect to the social interaction effect time attenuation processing unit 205.

S203: the social interaction effect time attenuation processing unit 205 receives the social interaction effect from the social interaction effect calculation unit 203 and the time attenuation function from the time attenuation function storage unit 204, calculates a time attenuation value of the social interaction effect, and outputs the time attenuation function to the violation prediction unit 207.

S204: the violation prediction unit 207 receives the social interaction effect subjected to time attenuation processing from the social interaction effect time attenuation processing unit 205 and a violation prediction model from the violation prediction model storage unit 206, and calculates and outputs the occurrence probability of the violation.

<Specific Processing Procedure>

Hereinafter, a specific processing procedure will be described. Hereinafter, the user ID is defined as follows.

$$u \in U = \{1, \ldots, |U|\} \qquad \text{[Math. 1]}$$

Assuming that user u has N target actions, the target action recording time of the user u is defined as follows.

$$t_u = (t_{u,1}, \ldots, t_{u,N})^T \qquad \text{[Math. 2]}$$

The target value is defined as follows.

$$g_u = (g_{u,1}, \ldots, g_{u,N})^T \qquad \text{[Math. 3]}$$

The measurement value of the target action is described as follows.

$$a_u = (a_{u,1}, \ldots, a_{u,N})^T \qquad \text{[Math. 4]}$$

A set of target action recording times for all users belonging to the user set U is defined as follows.

$$T = \{t_u \mid u \in U\} \qquad \text{[Math. 5]}$$

A set of target values of the target action is defined as follows.

$$G = \{g_u \mid u \in U\} \qquad \text{[Math. 6]}$$

A set of measurement values of the target action is described as follows.

$$A = \{a_u \mid u \in U\} \qquad \text{[Math. 7]}$$

In addition, on the assumption that the user u has M (times) conversation data, and that user u has L (types) relationship data for a conversation partner user $$v \in V = \{1, \ldots, |V|\} \qquad \text{[Math. 8]}$$

the conversation data is defined as follows.

$$c_u = (c_{u,1}, \ldots, c_{u,M})^T \qquad \text{[Math. 9]}$$

The conversation recording time is defined as follows.

$$s_u = (s_{u,1}, \ldots, s_{u,M})^T \qquad \text{[Math. 10]}$$

The relationship data with the user v is described as follows.

$$r_{u,v} = (r_{u,v,1}, \ldots, r_{u,v,L})^T \qquad \text{[Math. 11]}$$

A set of pieces of conversation data for all users belonging to the user set U is defined as follows.

$$C = \{c_u \mid u \in U\} \qquad \text{[Math. 12]}$$

A set of conversation recording times is defined as follows.

$$S = \{s_u \mid u \in U\} \qquad \text{[Math. 13]}$$

A set of relationship data with the user v is described as follows.

$$R = \{r_{u,v} \mid u \in U, v \in V\} \qquad \text{[Math. 14]}$$

Here, processing in the violation reference constant input unit 104 (FIG. 4: S100) will be described. The violation reference constant is a real value equal to or more than zero that defines how far the measurement value deviates from the target value in a certain target action for that action to be regarded as a violation. Hereinafter, the violation reference constant is denoted as k. The violation reference constant is a value for determining how many % (percentages) of a measurement value of the target action deviates from the target value. For example, in a case where the operation subject of the violation prediction apparatus 10 defines a rule of "if a measurement value deviates from the target value by +20% or more of the target value, the target action in which the measurement value is recorded is regarded as a violation", the operation subject of the violation prediction apparatus 10 is set to k=0.2 and is input to the violation reference constant input unit 104. The violation reference constant input unit 104 outputs the input violation reference constant k to the violation level calculation unit 105.

Processing in the conversation data evaluation unit 106 (FIG. 4: S101) will be described. The conversation data evaluation unit 106 receives conversation data C from the conversation data storage unit and evaluates the content and situation of the conversation. A function for deriving a conversation content evaluation value using conversation data c_(u, m) as an input is denoted by G_C, and a function for deriving a conversation situation evaluation value is denoted by G_S. Evaluation items of the conversation content evaluation value include, for example, a conversation time, the number of characters, the topic, the impression, and the like but are not limited thereto, and are determined in any manner by the operation subject of the violation prediction apparatus 10. An evaluation method is, for example, a questionnaire method actually asking and evaluating the user u, an automatic collection method using a Bluetooth sensor, a GPS sensor, conversation topic extraction, a conversation summary technology, or the like, or a combination thereof but are not limited thereto, and is determined in any manner by the operation subject of the violation prediction apparatus 10. Evaluation items of the conversation situation evaluation value include, for example, a distance, a means, a place, and the like with respect to the conversation partner but are not limited thereto, and are determined in any manner by the operation subject of the violation prediction apparatus 10. An evaluation method is mainly a questionnaire method of asking and evaluating the user but is not limited thereto, and is determined in any manner by the operation subject of the violation prediction apparatus 10.

For a conversation m of a certain user u, assuming that a certain evaluation item among a conversation content is $j\_C \in J\_C$, a certain evaluation item among a conversation status is $j\_S \in J\_S$, and an evaluation value of $j_c$ derived by a conversation content evaluation function is $e_{u,m,j\_s}$, it can be described as the following (Expression 1) and (Expression 2).

[Math. 15]

$$G_C(c_{u,m}) = \{e_{u,m,j_C} \mid j_C \in J_C\} \qquad \text{(Expression 1)}$$

[Math. 16]

$$G_S(c_{u,m}) = \{e_{u,m,j_S} \mid j_S \in J_S\} \qquad \text{(Expression 2)}$$

The conversation data evaluation unit 106 calculates $G_C(c_{u,m})$ and $G_S(c_{u,m})$ for all conversations of all users, and outputs $G_C(c_{u,m})$ and $G_S(c_{u,m})$ to the social interaction effect calculation unit 108. In addition, conversation partner information (information corresponding to ID) V included in the conversation data C is output to the relationship data evaluation unit 107.

Processing in the relationship data evaluation unit 107 (FIG. 4: S102) will be described. The relationship data evaluation unit 107 receives the relationship data R from the relationship data storage unit 103 and the conversation partner information V from the conversation data evaluation unit 106, and evaluates the relationship with the partner of the conversation. Evaluation items of the relationship include, for example, affinity, reliability, a period, a contact frequency, and the like but are not limited thereto, and are determined in any manner by the operation subject of the violation prediction apparatus 10. A partner of the conversation m of the certain user u is denoted as $v_{u,m}$. At this time, a set including all the conversation partners of the user u is determined as follows.

[Math. 17]

$$V_u = \{v_{u,m} \mid 1 \leq m \leq M\}$$

A conversation partner of a certain user

[Math. 18]

$$v_u \in V_u$$

is used as input, and a function that derives a certain relationship evaluation value with the conversation partner is denoted by $G_R$. Here, assuming that a certain relationship evaluation item in the relationship evaluation function $G_R$ is

[Math. 19]

$$j_R \in J_R,$$

and an evaluation value thereof is $e_{u,v_u,j_R}$, it can be described as the following (Expression 3).

[Math. 20]

$$G_R(v_u) = \left\{ e_{u,v_u,j_R} \mid j_R \in J_R \right\} = \left\{ r_{u,v_u,j_R} \mid j_R \in J_R \right\} \qquad \text{(Expression 3)}$$

The relationship data evaluation unit 107 calculates $G_R(v_u)$ for all the conversation partners of all the users, and outputs it to the social interaction effect calculation unit 108.

Processing in the social interaction effect calculation unit 108 (FIG. 4: S103) will be described. The social interaction effect refers to the strength of the influence of conversation on the user. The social interaction effect calculation unit 108 receives the conversation content evaluation value $G_C(c_{u,m})$ and the conversation situation evaluation value $G_S(c_{u,m})$ from the conversation data evaluation unit and the relationship evaluation value $G_R(v_u)$ from the relationship data evaluation unit 107, and calculates a social interaction effect based on these values. Here, as an example, the product of an evaluation value

[Math. 21]

$$e_{u,m,impression} \in G_C(c_{u,m})$$

of the impression of conversation content in the conversation m of the certain user u and an evaluation value

[Math. 22]

$$e_{u,m,trust} \in G_R(v_{u,m})$$

of reliability of the conversation partner is defined as the magnitude of the social interaction effect. However, as long as the conversation content evaluation value, the conversation situation evaluation value, and the relationship evaluation value are used, the method of calculating the magnitude of the social interaction effect is determined in any manner by the operation subject of the violation prediction apparatus 10.

When the magnitude of the social interaction effect exerted on the user u by a conversation m of a certain user u is $z_{u,m}$, it is described as the following (Expression 4).

[Math. 23]

$$z_{u,m} = e_{u,m,impression} e_{u,m,trust} \qquad \text{(Expression 4)}$$

The social interaction effect calculation unit 108 calculates $z_{u,m}$ for all conversations of all users, and outputs $z_{u,m}$ to the social interaction effect time attenuation processing unit 110.

Processing in the time attenuation processing function input unit 119 (FIG. 4: S104) will be described. The time attenuation function is a function expressing a state in which the magnitude of the social interaction effect is attenuated with the lapse of time. The time attenuation function is determined by a function such as a linear function, a step function, a hyperbolic function, or a sigmoid function but is not limited thereto, and is determined in any manner by the operation subject of the violation prediction apparatus 10 as long as the above definition is followed. Hereinafter, the time attenuation function is denoted as d. Here, as an example, a case where the sigmoid function illustrated in (Expression 5) is employed will be described. The operation subject of the violation prediction apparatus 10 inputs the following time attenuation function d to the time attenuation function input unit 109, and the time attenuation function input unit 109 outputs the input time attenuation function d to the social interaction effect time attenuation processing unit 110.

[Math. 24]

$$d(x) = \frac{1}{1 + e^{-x}} \qquad \text{(Expression 5)}$$

Processing in the violation level calculation unit 105 (FIG. 4: S105) will be described. The violation level calculation unit 105 receives the target action data A from the target action data storage unit 101 and the violation reference constant k from the violation reference constant input unit 104, and calculates the violation level of the target action. This calculation method includes a method in which the violation level is a continuous value and a method in which the violation level is a discrete value. Each will be described below.

(1) In a case of the continuous value: a measurement value of an i-th target action of a certain user u is $a_{u,i}$, and a target value is $g_{u,i}$. At this time, the violation level $y_{u,i}$ is determined as the following (Expression 6). In this case, the violation reference constant k is not used.

[Math. 25]

$$y_{u,i} = a_{u,i} - g_{u,i} \qquad \text{(Expression 6)}$$

(2) In a case of the discrete value: a measurement value of the i-th target action of a certain user u is $a_i$, and a target value is $g_i$. For any sequence

[Math. 26]

$$n = \{ n_j \mid j = 1, \ldots, J; n_j < n_{j+1} \}$$

that satisfies the condition that the preceding element is smaller than the succeeding element in two consecutive elements, the violation level y is determined by the following (Expression 7).

[Math. 27]

$$y_{u,i} = \begin{cases} j, & n_j k g_{u,i} \le a_{u,i} - g_{u,i} < n_{j+1} k g_{u,i} \\ 0, & \text{otherwise} \end{cases} \qquad \text{(Expression 7)}$$

For example, when the violation level is determined in two stages according to the rule of "if the measurement value of the target action is +20% or more of the target value, the action is a violation, and if not, the action is not a violation", the operation subject of the violation prediction apparatus 10 sets k=0.2, n={1, ∞}, and determines the violation level of the target action.

Furthermore, in a case where the violation level is determined in three stages according to a rule of "the violation level is 1 if the measurement value of the target action is +20% or more of the target value, the violation level is 2 if the measurement value is +50% or more, or otherwise the violation level is 0", k=0.2, n={1, 2.5, ∞} is set.

The violation level calculation unit 105 calculates the violation level $y_{u,i}$ for all the actions of all the users by the above processing, and outputs the violation level $y_{u,i}$ to the violation prediction model training unit 112.

Processing in the social interaction effect time attenuation processing unit 110 (FIG. 4: S106) will be described. The social interaction effect time attenuation processing unit 110 receives the temporal interaction effect $z_{u,m}$ from the social interaction effect calculation unit 108 and the time attenuation function d from the time attenuation function input unit 109, and calculates a time attenuation value $x_{u,m}$ of the social interaction effect. Here, assuming that the social interaction effect attenuates as determined by the time attenuation function due to the lapse of time from the conversation recording time to the target action recording time, $x_{u,m}$ is calculated using the following (Expression 8).

[Math. 28]

$$x_{u,m} = d(s_{u,m} - t_{u,i})z_{u,m} \qquad \text{(Expression 8)}$$

The social interaction effect time attenuation processing unit 110 calculates a social interaction effect $x_{u,m}$ subjected to time attenuation processing for all the social interaction effects of all the users, and outputs the social interaction effect $x_{u,m}$ subjected to time attenuation processing to the violation prediction model training unit 112.

Processing in the violation prediction model training unit 112 (FIG. 4: S107) will be described. The violation prediction model training unit 112 receives the violation level $y_{u,i}$ from the violation level calculation unit 105 and the social interaction effect $x_{u,m}$ subjected to time attenuation processing from the social interaction effect time attenuation processing unit 110, and performs training of parameters for predicting $y_{u,i}$ from $x_{u,m}$. Here, as an example, a case where a binary violation level calculated as a discrete value is received from the violation level calculation unit 105 will be described.

The structure of the prediction model can be exemplified by logistic regression, a support vector machine, a long short term memory (LSTM), and the like, but is determined in any manner by the operation subject of the violation prediction apparatus 10 as long as supervised training can be applied. However, at the time of training the prediction model, $x_{u,m}$ for predicting $y_{u,i}$ needs to be recorded before (in the past) $y_{u,i}$. That is, the violation prediction model training unit 112 performs training of a parameter set Θ that is as follows.

[Math. 29]

$$F(\theta): \{x_{u,m} \mid s_{u,m} \leq t_{u,i}\} \rightarrow y_{u,i} \qquad \text{(Expression 9)}$$

Here, as an example, a case where $y_{u,i}$ is predicted from an average value $x_{u,i}$ for m of elements of

[Math. 30]

$$X = \{x_{u,m} \mid s_{u,m} \leq t_{u,i}\}$$

is considered. As other methods, a method of employing only $x_{u,m}$ having a value equal to or more than a certain value, a case of extracting an element included in X as a time-series vector and predicting $y_{u,i}$ from time-series data, and the like are considered.

Here, when a social interaction effect vector having $x_{u,i}$ as an element is denoted by

[Math. 31]

$$x,$$

a violation label vector having $y_{u,i}$ as an element is denoted by $$y, \qquad \text{[Math. 32]}$$

a training parameter is θ∈ Θ, and an error vector is denoted by $$\epsilon, \qquad \text{[Math. 33]}$$

these vectors can be described as the following (Expression 10) to (Expression 12).

[Math. 34]

$$x_{u,i} = \frac{1}{|X|} \sum_{x_{u,m} \in X} x_{u,m} \qquad \text{(Expression 10)}$$

[Math. 35]

$$x = (x_{u,i}) = (x_{1,1}, \cdots, x_{2,1}, \cdots, x_{U,M})^T \qquad \text{(Expression 11)}$$
$$y = (y_{u,i}) = (y_{1,1}, \cdots, y_{2,1}, \cdots, y_{U,M})^T$$

[Math. 36]

$$y = \theta x + \epsilon \qquad \text{(Expression 12)}$$

Here, when the predicted value vector of y is $$\hat{y}, \qquad \text{[Math. 37]}$$

then, the predicted value vector can be described by the following (Expression 13).

$$\hat{y} = \theta x \qquad \text{[Math. 38]}$$

Thus, an error vector $$\epsilon \qquad \text{[Math. 39]}$$

can be described as (Expression 14) below.

[Math. 40]

$$\epsilon = y - \hat{y} = y - \theta x \qquad \text{(Expression 14)}$$

The violation prediction model training unit 112 performs training of a parameter that minimizes an error using (Expression 14). Here, a method of determining an optimum parameter by the least squares method will be described as an example. In a solution by the least squares method, desired parameters are obtained by solving the following optimization problem.

[Math. 41]

$$\underset{\theta}{\text{argmin}}\, \epsilon^T \epsilon = \underset{\theta}{\text{argmin}}(y - \theta x)^T (y - \theta x) \qquad \text{(Expression 15)}$$

For this (Expression 15), a loss function is defined as follows.

$$L(\theta) = (y - \theta x)^T (y - \theta x) \qquad \text{[Math. 42]}$$

Then, it is only necessary to search for a point at which the gradient of the loss function with respect to θ becomes zero. Therefore, when an optimum parameter is θ*, a parameter θ* that satisfies the following expressions and minimizes the error is derived.

$$\frac{\partial L(\theta^*)}{\partial \theta} = 0 \Leftrightarrow -2x^T y + 2\theta^* x^T x = 0 \Leftrightarrow \theta^* = x^T y (x^T x)^{-1} \qquad \text{[Math. 43]}$$

The violation prediction model training unit 112 calculates the parameter θ* by the above processing, and outputs a violation prediction model F and the optimum parameter θ* to the violation prediction model storage unit 113.

Next, processing in the conversation data evaluation unit 201 (FIG. 6: S200) will be described. The conversation data evaluation unit 201 receives the conversation data as an input and evaluates the content, situation, and partner of the conversation. Here, the input conversation data is c. The conversation data c is evaluated by a conversation content evaluation function $G_C$ and a conversation situation evaluation function $G_S$, and an evaluation result is output to the social interaction effect calculation unit 203. In addition, conversation partner information v of the conversation partner is output to the relationship data evaluation unit 202.

Processing in the relationship data evaluation unit 202 (FIG. 6: S201) will be described. The relationship data evaluation unit 202 receives the relationship data as an input, receives the conversation partner information v from the conversation data evaluation unit 201, evaluates the relationship data of the conversation partner v by the relationship evaluation function $G_R$, and outputs an evaluation result to the social interaction effect calculation unit 203.

Processing in the social interaction effect calculation unit 203 (FIG. 6: S202) will be described. The social interaction effect calculation unit 203 receives a conversation content evaluation value $G_C(c)$ and a conversation situation evaluation value $G_S(c)$ from the conversation data evaluation unit 201 and a relationship data evaluation value $G_R(v)$ from the relationship data evaluation unit 202, and calculates a social interaction effect.

Here, as an example, when the social interaction effect z is the product of an evaluation value $$e_{impression} \in G_C(c) \qquad \text{[Math. 44]}$$

regarding the impression of content of the conversation, and an evaluation value $$e_{trust} \in G_R(v) \qquad \text{[Math. 45]}$$

regarding the reliability of the conversation partner, the social interaction effect z is described as follows.

$$z = e_{impression} e_{trust} \qquad \text{[Math. 46]}$$

The social interaction effect calculation unit 203 calculates the social interaction effect z by the above processing, and outputs the social interaction effect z to the social interaction effect time attenuation processing unit 205.

Processing in the social interaction effect time attenuation processing unit 205 (FIG. 6: S203) will be described. The social interaction effect time attenuation processing unit 205 receives the social interaction effect z from the social interaction effect calculation unit 203 and the time attenuation function d from the time attenuation function storage unit 204, and calculates a time attenuation value of the social interaction effect. When the occurrence time of the violation to be predicted is t, the time at which the conversation used to calculate the social interaction effect is made is s, and the time attenuation function d is a sigmoid function, the social interaction effect x subjected to time attenuation processing is calculated as follows.

$$x = d(s - t)z \qquad \text{[Math. 47]}$$

The social interaction effect time attenuation processing unit 205 calculates the social interaction effect subjected to time attenuation processing by the above processing, and outputs the social interaction effect subjected to time attenuation processing to the violation prediction unit 2077.

Processing in the violation prediction unit 207 (FIG. 6: S204) will be described. The violation prediction unit 207 receives the social interaction effect x subjected to time attenuation processing from the social interaction effect time attenuation processing unit 205 and the prediction model F and the learned parameter θ* from the violation prediction model storage unit 206, and predicts a value (probability) y of the violation as follows.

$$y = F(x) = \theta^* x \qquad \text{[Math. 48]}$$

The violation prediction unit 207 calculates and outputs a value (probability) of the violation by the above processing.

This is the end of the description of the specific processing procedure.

Main Effects of Embodiment

As described above, according to the present embodiment, the violation prediction apparatus 10 comprehensively evaluates the relationship with the partner of the social interaction and the content of the conversation, and captures the time attenuation of the influence of the social interaction. Thus, an effect can be obtained that the prediction performance of the violation can be improved.

Supplement

The present invention is not limited to the above-described embodiment, and may be configured or processed (operated) as described below.

The violation prediction apparatus 10 can also be implemented by a computer and a program, but this program can be recorded in a (non-transitory) recording medium or provided through a network such as the Internet.

REFERENCE SIGNS LIST

10 Violation prediction apparatus
101 Target action data storage unit
102 Conversation data storage unit
103 Relationship data storage unit
104 Violation reference constant input unit
105 Violation level calculation unit
106 Conversation data evaluation unit
107 Relationship data evaluation unit
108 Social interaction effect calculation unit
109 Time attenuation function input unit
111 Time attenuation function storage unit
112 Violation prediction model training unit
113 Violation prediction model storage unit
201 Conversation data evaluation unit
202 Relationship data evaluation unit
203 Social interaction effect calculation unit
204 Time attenuation function storage unit
205 Social interaction effect time attenuation processing unit
206 Violation prediction model storage unit
207 Violation prediction unit

The invention claimed is:

1. A violation prediction apparatus that predicts an occurrence probability of a violation, the violation prediction apparatus comprising:
a memory configured to store conversation data and relationship data, the conversation data including conversation content data and conversation situation data, the relationship data indicating a relationship with a target user; and a processor coupled to the memory and configured to:
receive the conversation data and the relationship data from the memory;
evaluate the conversation data and identify a partner of a conversation by performing machine-implemented extraction of a conversation content and a conversation situation from the conversation data, thereby obtaining a conversation content evaluation value and a conversation situation evaluation value;
evaluate a relationship with the partner of the conversation based on the relationship data and conversation partner information, thereby obtaining a relationship evaluation value;
calculate a social interaction effect based on the conversation content evaluation value, the conversation situation evaluation value, and the relationship evaluation value;
calculate a time attenuation value of the social interaction effect based on a time attenuation function executed by the processor;
calculate a violation level of a target action;
train a probability-prediction model using machine-learning training techniques based on the violation level of the target action and the social interaction effect subjected to time attenuation processing; and
calculate an occurrence probability of a violation based on the social interaction effect subjected to time attenuation processing by executing the trained probability-prediction model.

2. The violation prediction apparatus according to claim 1, wherein the processor is configured to:
receive an input of a violation reference constant that is a value for determining how many percentages of a measurement value of the target action deviates from a target value; and
calculate the violation level of the target action using the violation reference constant.

3. A violation prediction method executed by a violation prediction apparatus that predicts an occurrence probability of a violation using a memory and a processor coupled to the memory, the violation prediction method comprising:
storing conversation data and relationship data in the memory, the conversation data including conversation content data and conversation situation data, the relationship data indicating a relationship with a target user;
receiving the conversation data and the relationship data by the processor from the memory;
evaluating the conversation data and identifying a partner of a conversation by performing machine-implemented extraction of a conversation content and a conversation situation from the conversation data, thereby obtaining a conversation content evaluation value and a conversation situation evaluation value;
evaluating a relationship with the partner of the conversation based on the relationship data and conversation partner information, thereby obtaining a relationship evaluation value;
calculating a social interaction effect based on the conversation content evaluation value, the conversation situation evaluation value, and the relationship evaluation value;
calculating a time attenuation value of the social interaction effect based on a time attenuation function executed by the processor;
calculating a violation level of a target action;

training a probability-prediction model using machine-learning training techniques based on the violation level of the target action and the social interaction effect subjected to time attenuation processing; and calculating an occurrence probability of a violation based on the social interaction effect subjected to time attenuation processing by executing the trained probability-prediction model.

4. A non-transitory computer-readable recording medium storing a program for causing a computer to execute the method of claim 3.

\* \* \* \* \*